United States Patent
Jurgens

[15] 3,669,355
[45] June 13, 1972

[54] IRRIGATION APPARATUS

[72] Inventor: Adolph C. Jurgens, 5135 North Keating Avenue, Chicago, Ill. 60630

[22] Filed: Nov. 12, 1968

[21] Appl. No.: 774,656

[52] U.S. Cl..............................239/177, 239/191, 239/212
[51] Int. Cl.......................................................B05b 3/00
[58] Field of Search................239/177, 178, 191, 192, 212, 239/166

[56] References Cited

UNITED STATES PATENTS

| R26,285 | 10/1967 | Stafford | 239/191 X |
|---|---|---|---|
| 729,650 | 6/1903 | Olofsson | 239/191 |
| 2,057,217 | 10/1936 | Soper | 239/191 X |
| 2,518,952 | 8/1950 | Sohmer | 239/166 X |
| 3,140,827 | 7/1964 | Fletcher | 239/212 X |
| 3,353,751 | 11/1967 | Dowd | 239/177 |
| 3,381,893 | 5/1968 | Smith, Jr. et al. | 239/177 X |
| 3,448,927 | 6/1969 | Blair | 239/177 |

FOREIGN PATENTS OR APPLICATIONS

| 324,113 | 8/1920 | Germany | 239/177 |

Primary Examiner—Lloyd L. King
Attorney—Paul H. Gallagher

[57] ABSTRACT

Irrigation apparatus including a water supply pipe supported by a plurality of carriages spaced therealong, the carriages having wheels spaced in the direction of movement and on opposite sides of the pipe, and vertically retractable and extendible in response to unevenness in the ground tending to support the pipe evenly, and cables supporting the pipe at a plurality of points between the carriages and from points on the carriages spaced transversely of and on opposite sides of the pipe.

12 Claims, 24 Drawing Figures

PATENTED JUN 13 1972 3,669,355

INVENTOR
Adolph C. Jurgens
BY Paul H. Gallagher
ATTY.

INVENTOR
ADOLPH C. JURGENS
BY Paul H Gallagher
ATTY.

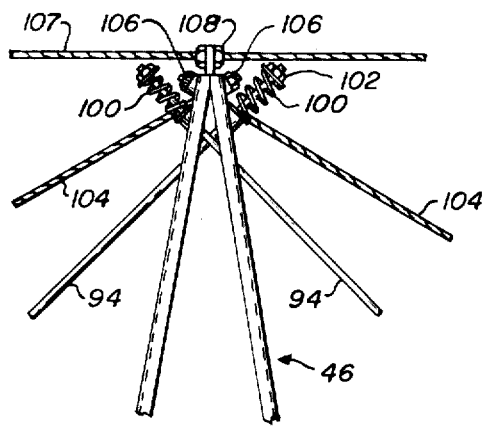
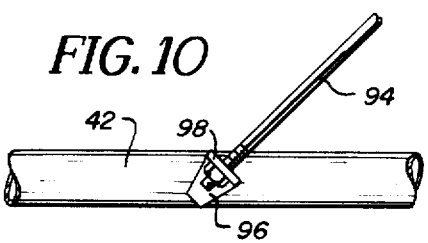
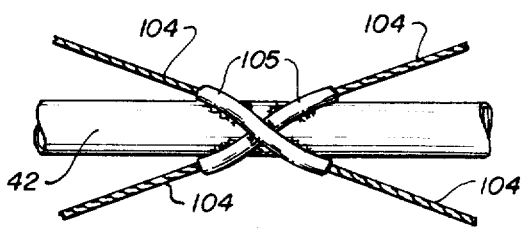
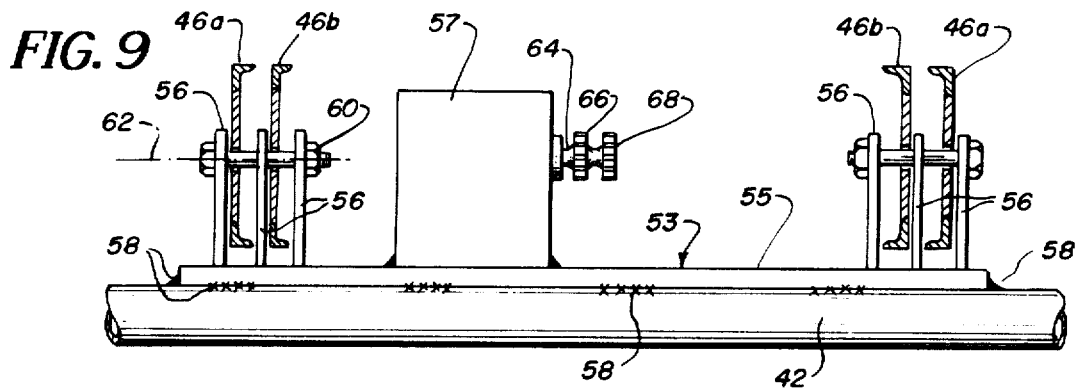
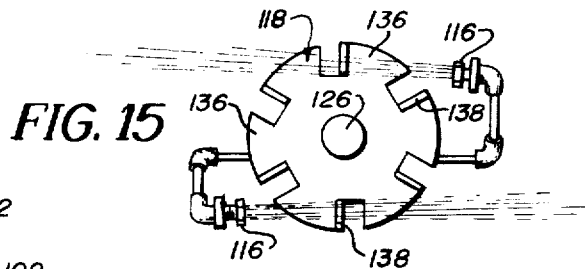
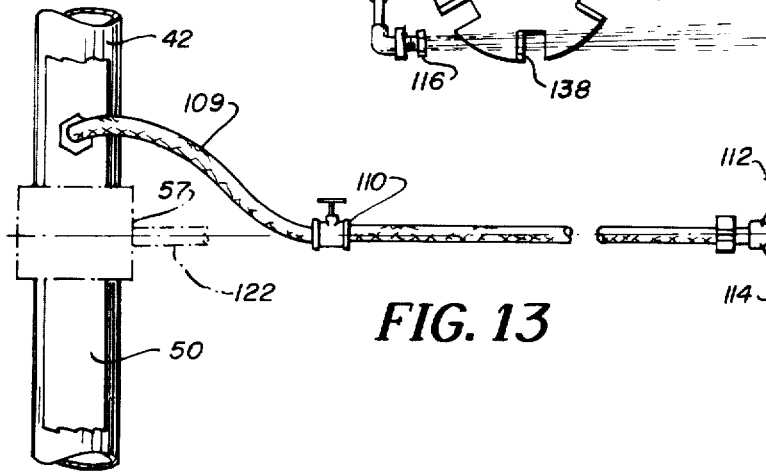
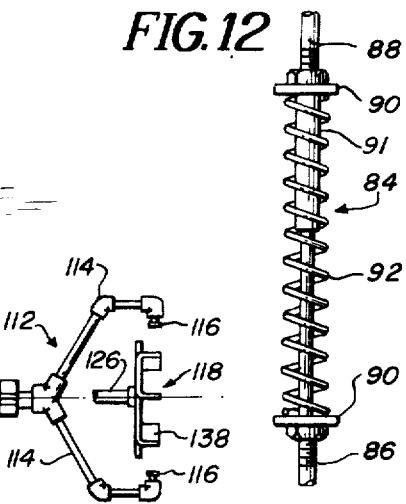
INVENTOR
Adolph C. Jurgens
ATTY.

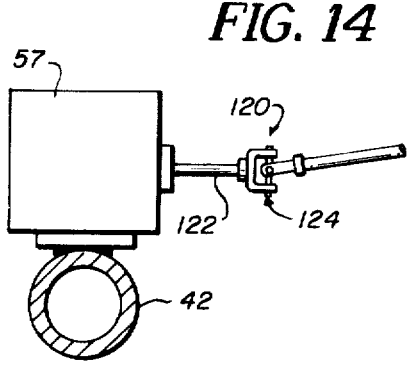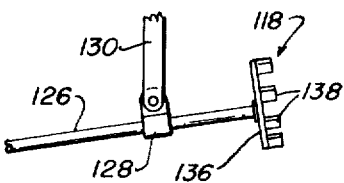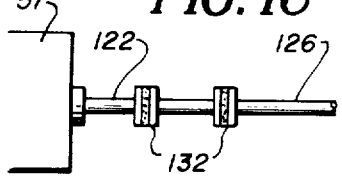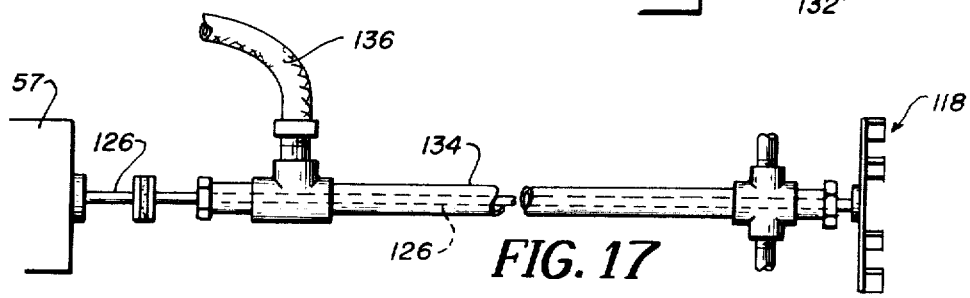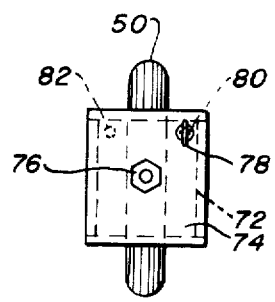

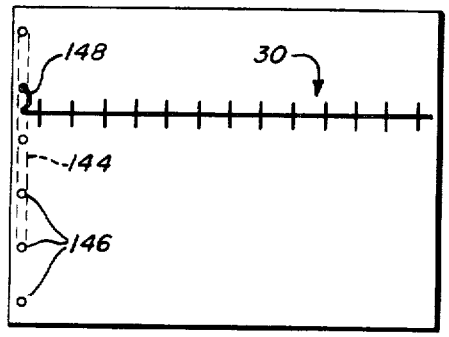
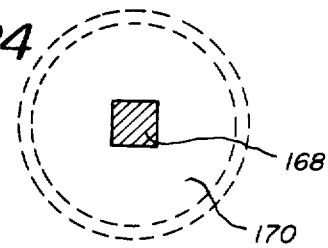
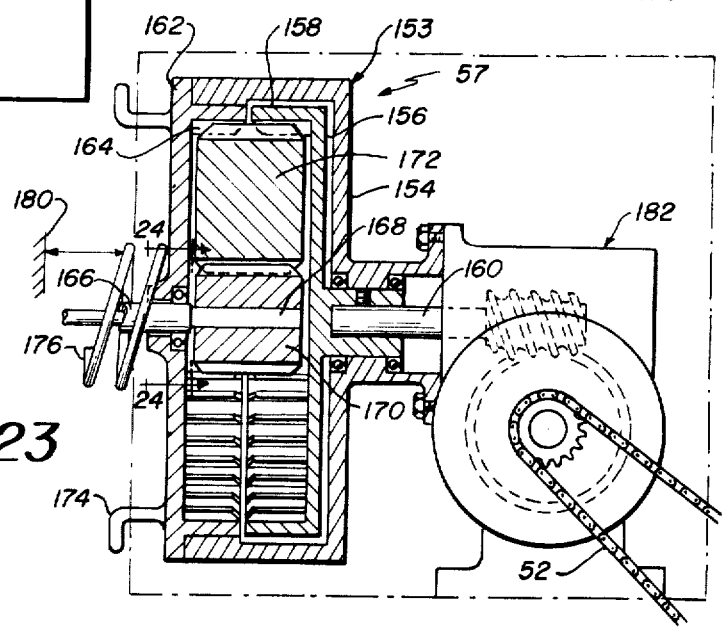
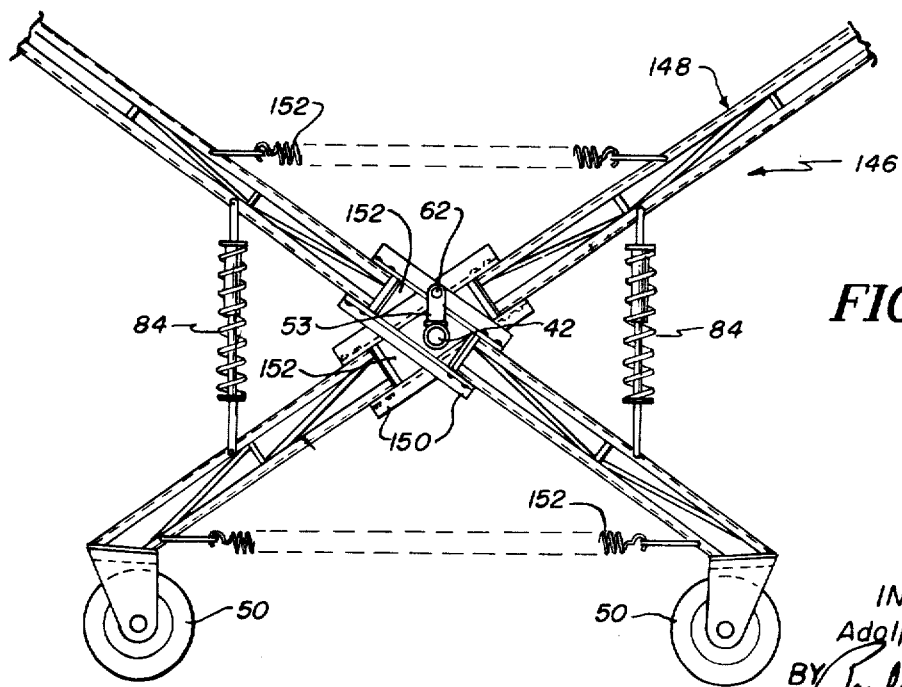

3,669,355

IRRIGATION APPARATUS

BACKGROUND

The invention resides in the field of that kind of irrigation apparatus utilizable with an underground main having one or more standpipes projecting above the ground to which a supply pipe is connected which is moved across an area to be irrigated, having a number of spray nozzles spaced along the pipe and effective for distributing the irrigating water over the area traversed by the supply pipe.

OBJECTS OF THE INVENTION

A broad object of the present invention is to provide novel irrigation apparatus which is disposed above the ground and self-propelled therealong by the pressure of the water being moved therethrough for irrigation purposes.

Another broad object is to provide novel irrigation apparatus of the above character which is of unusually stable construction and operable for suspending the pipe carrying the irrigating water supporting it uniformly along its length, and also supporting it against displacement sideways.

Still another object is to provide irrigation apparatus of the foregoing character of novel construction effective for supporting the water pipe effectively in proper position notwithstanding unevenness in the ground.

Still another object is to provide irrigation apparatus of the foregoing character which because of its novel construction and support of the water pipe can be made of unusually great length and corresponding great capacity.

A further object is to provide irrigation apparatus of the foregoing character which is self-propelled generally transversely across the ground, and in which the sprinkling or water distribution operation takes place rearwardly of the water supply pipe whereby to prevent undue wetting of the ground in the area of the self-propelling wheels whereby to provide good traction of the apparatus in the self-propelling operation.

An additional object is to provide apparatus of the foregoing character which is of self-propelling characteristics, and provided with propelling wheels, wherein the overall structure can be build relatively high from the ground to accommodate correspondingly high crops, but which is supported on relatively small wheels, with corresponding convenience and economy in manufacture.

An additional object is to provide irrigation apparatus of the foregoing character which is particularly adaptable to alternatively positioning its supporting wheels for convenience in moving the apparatus from one site or location to another.

Still another object is to provide irrigation apparatus of the foregoing general character which is not only stable in operative position, but remains stable in the same degree throughout all of its movements resulting from unevenness in the ground.

A still further and more specific object is to provide irrigation apparatus of the foregoing general character including a supply pipe of great length and a plurality of carriages spaced along the supply pipe for supporting it, in which each carriage includes supporting points on opposite sides of the pipe in the direction of the movement of the pipe and wherein the supporting points remain symmetrical on opposite sides of the pipe regardless of all movements and deflections of the pipe in vertical directions, whereby to provide stability to each of the carriages in direction of movement, i.e., transversely of the length of the pipe, regardless of the vertical position of the pipe due to unevenness in the ground.

A still further object of the invention is to provide irrigation apparatus of the foregoing character which is adapted to movement across a field uniformly in direction transverse to the length of the field, whereby to uniformly cover a rectangular field, as distinguished from the coverage provided by a rotary type apparatus.

An additional object is to provide a novel gear reduction device including interchangeable parts facilitating changing the ratio of reduction thereof, and further such a device particularly adapted to irrigation apparatus.

DESCRIPTION OF A PREFERRED EMBODIMENT OF THE INVENTION

In the drawings:

FIG. 8 is a large scale detail view of the portion of the apparatus enclosed in dot-dash lines at the upper portion of FIG. 4;

FIG. 9 is a large scale view of an attachment for mounting the supply pipe on one of the carriages;

FIG. 10 is a detail view on a large scale taken at line 10—10 of FIG. 4;

FIG. 11 is a view in large scale taken in the area enclosed by dot-dash lines 11 of FIG. 4, from the underside of the pipe;

FIG. 12 is a large scale detail view of a spring-mounting arrangement, indicated in enclosing dot-dash lines 12 of FIG. 5;

FIG. 13 is a large scale view of a sprinkler unit;

FIG. 14 is a large scale detail view of a self-propelling unit;

FIG. 15 is a large scale view taken at line 15—15 of FIG. 5;

FIG. 16 shows an alternate form of detail construction of self propelling unit;

FIG. 17 shows an alternate combination construction including elements of the sprinkling unit and the self-propelling unit;

FIG. 18 is a detail view of a portion of the means for mounting a wheel, taken at line 18—18 of FIG. 5;

FIG. 19 is a detail view oriented according to FIG. 5 but showing alternate positions of the wheels, i.e., the position for transporting the apparatus from one location to another;

FIG. 20 is a detail view of a portion of carriage showing an alternate rigid construction;

FIG. 21 is a semi-diagrammatic plan view of a rectangular area to be irrigated and indication of the arrangement of the apparatus for movement uniformly transversely across that area, as distinguished from rotary movement;

FIG. 22 is a view oriented according to FIG. 5 showing a modified form of carriage;

FIG. 23, partially in axial section, shows one form of gear reducer; and

FIG. 24 is a view taken at line 24—24 of FIG. 23.

Figure 1:
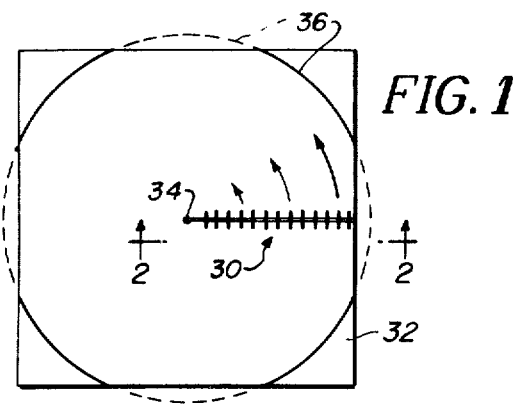
FIG. 1 is a plan view semi-diagrammatic in nature of the apparatus of the present invention as positioned in a field or area to be irrigated.
Figure 2:
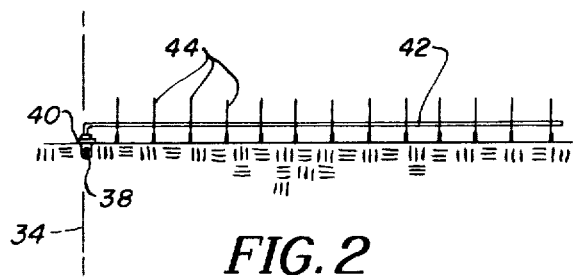
FIG. 2 is a semi-diagrammatic view of the apparatus, taken in side view as indicated at line 2—2 of FIG. 1.
Figure 3:
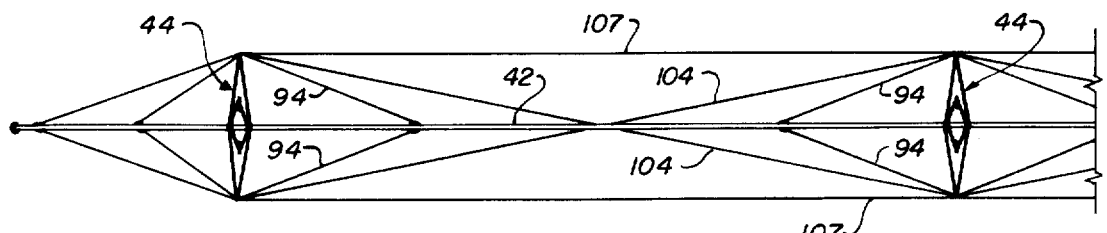
FIG. 3 is a top view of a portion of the apparatus on a relatively larger scale.
Figure 4:
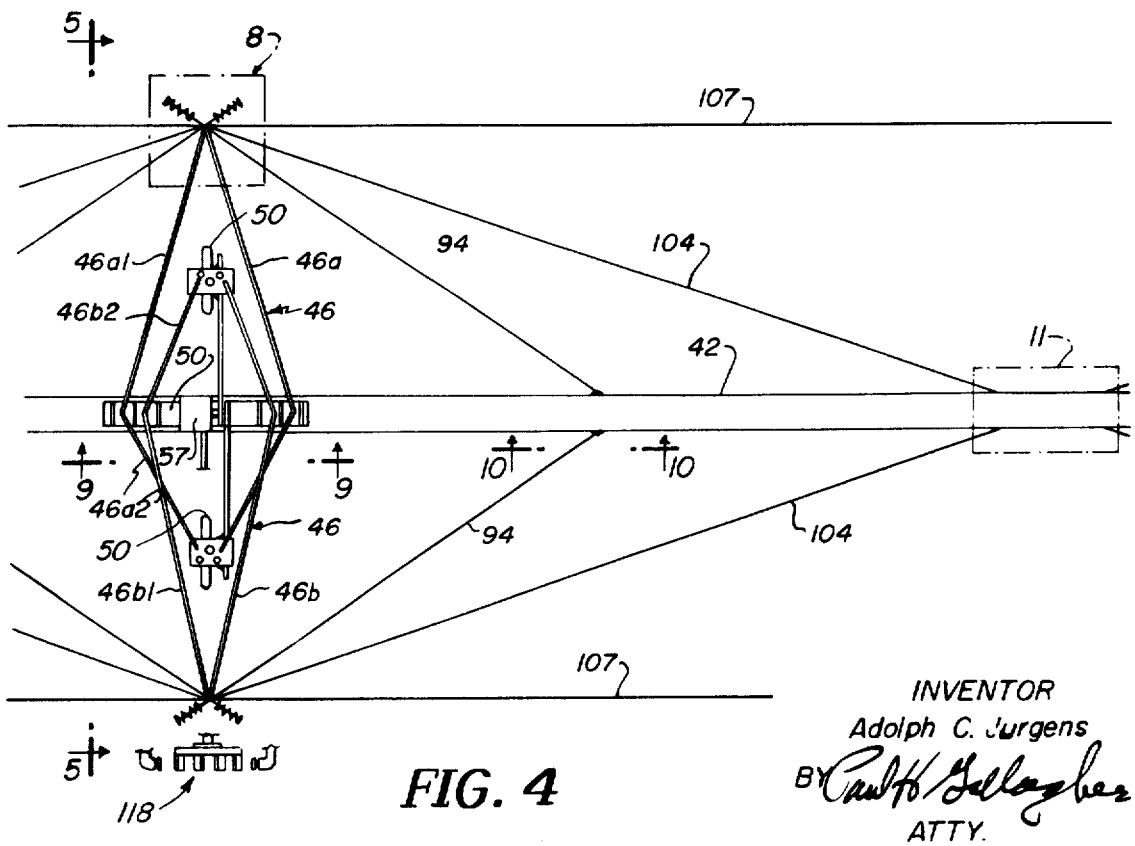
FIG. 4 is a large scale view of one of the carriages of the apparatus, being in plan and thus oriented according to FIG. 3.

Referring now in detail to the accompanying drawings, attention is directed first to FIGS. 1 and 2. The apparatus is shown in its entirety at 30 mounted in position in an area 32 rectangular in shape, and mounted for rotary movement in that area about an axis 34, thereby describing a circular area 36, the major portion of which coincides with a major portion of the area of the rectangular area or field 32. Due to various circumstances it becomes more convenient to arrange the apparatus for rotary movement and thus the portion of the field that is irrigated is an optimum portion, considering the area beyond which irrigation does take place, from an economic standpoint for irrigating the intended area 32. It has been found that rotary types of apparatus are useful and economic, but the invention is not limited thereto as pointed out hereinbelow.

The irrigation apparatus 30 is adapted for use with a water supply main 38 imbedded in the ground from which extends a standpipe 40 defining the axis 34, in this case in the center of the field. The apparatus itself includes a water supply pipe 42 preferably in sections connected with the standpipe and supported by a plurality of carriages 44 spaced along the supply pipe throughout the full radius thereof in accordance with the circular area 36 to be covered. The apparatus may be of any length within a wide range, and a common length of apparatus, or pipe 42 is on the order of 1,300 feet, which as a radius and sweeping through an area 36, plus the projection of the water longitudinally beyond the supply pipe, covers an area of about a quarter of a mile in radius, and effectively, or nearly, covers a quarter section in area. The supply pipe 42 may for example be 6 inches in diameter and the carriages 44 for supporting the pipe are preferably on the order of 100 feet apart, there being, therefore, 13 of the carriages along that pipe of the length indicated.

Figure 5:
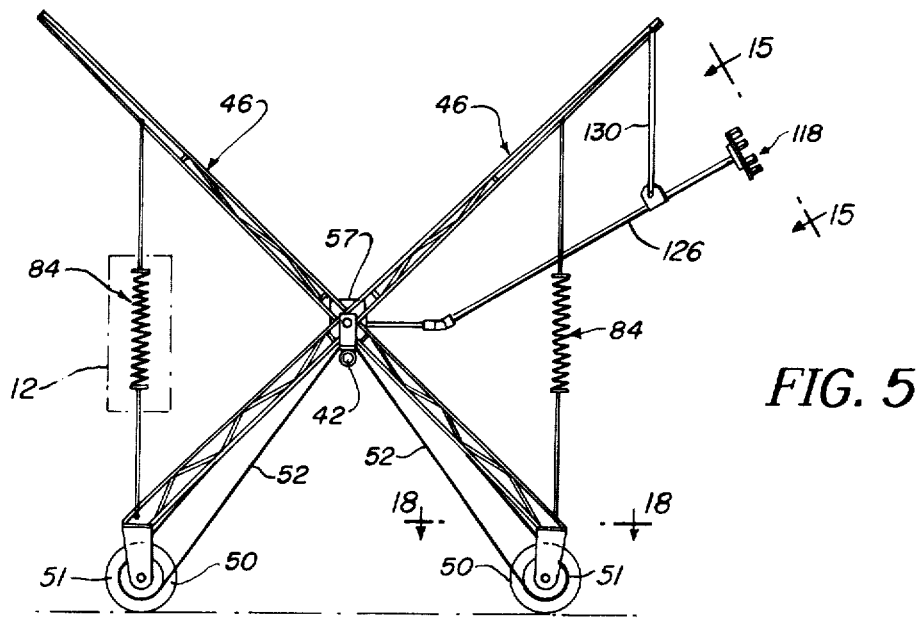
FIG. 5 is a view of the carriage taken at line 5—5 of FIG. 4, showing the carriage in extended position.
Figure 6:
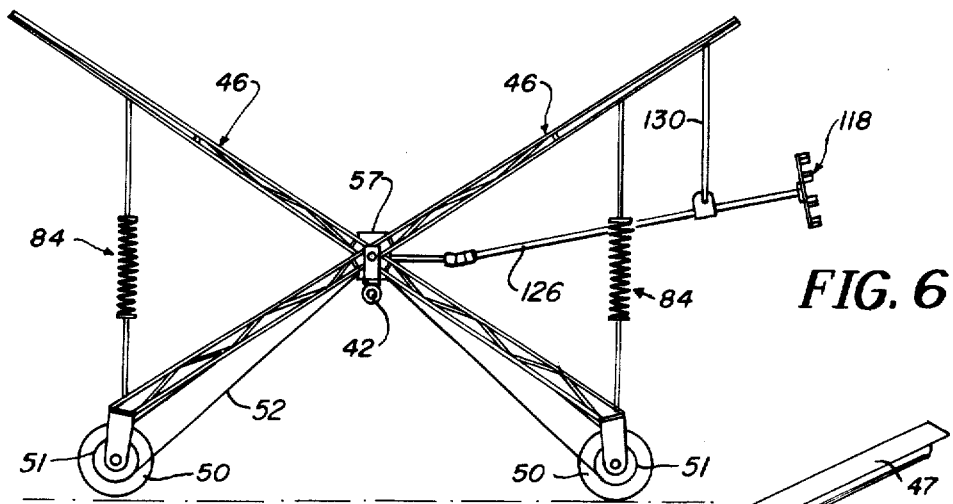
FIG. 6 is a view similar to FIG. 5 but showing the carriage in retracted position.
Figure 7:
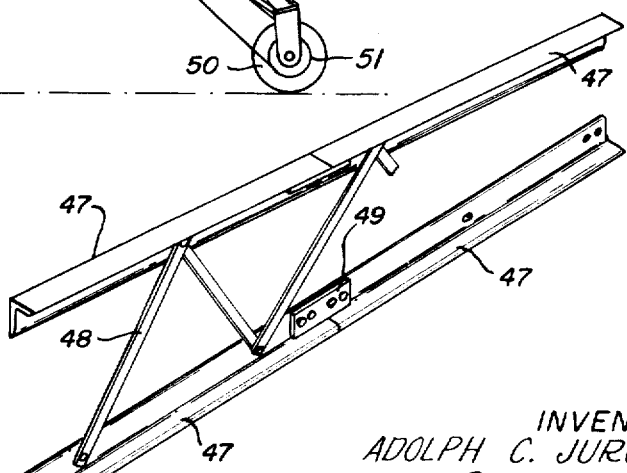
FIG. 7 is a detail perspective view of construction utilized in the frames of the carriages.

The details of the structure of the carriages are shown in FIGS. 3-9. Each carriage includes a pair of frame members 46 which are closely similar and substantially identical in structure, and individually identified as 46a and 46b. Each member frame is made up of a pair of "A" frames, individually identified 46a1 and 46a2 in the one case and 46b1 and 46b2 in the other case. Each of the elements or legs of the "A" frames is preferably in the form of a truss as shown in FIG. 7, including angle irons 47 with diagonal pieces 48 interconnecting them. The two "A" frames of each frame member, such as for example 46a1, 46a2, are arranged in opposed manner but together forming a continuous frame member, preferably straight in direction as viewed in FIGS. 5 and 6, each frame member thereby having a relatively long leg 46a1, 46a2, respectively, and a relatively short leg 46b1, 46b2.

The frame members 46 of the carriage are preferably made of segmented construction for facilitating assembling and disassembling them in the field, which may be arranged in any of various ways. For example, as shown in FIG. 7 the angle irons 47 may be separate pieces secured together by splice elements 49 removably held in position as by means of bolts.

The frame members 46 are mounted on wheels 50 at their lower ends, the latter being provided with sprockets 51 on which are trained chains 52 for propelling the carriage by the force of the irrigating water as described below. The means for mounting the supply pipe on the carriages may be of suitable type, but a construction represented in FIG. 9 has been found very successful. A complete unit is indicated at 53 and includes a base plate 55 having adjacent each end a plurality of, e.g., three, plates 56 welded or otherwise suitably secured thereto. This unit also includes a gear reducer 57 to be referred to again hereinbelow. The unit is secured to the pipe 42 preferably by welding as indicated at 58. The "A" frames 46 are pivotably mounted in the plates 56, and pivoted on axis means such as bolts 60 mounted in the plates 56, on an axis 62. The "A" frames 46 are thus mounted for relative swinging movement about that axis in the movements of the carriage in response to uneven ground, as referred to again herein below. For purposes brought out fully hereinbelow, the gear reducer 57 has an output shaft 64 disposed on the axis 62, provided with sprockets 66, 68 on which the chains 52 are trained respectively for use in propelling the apparatus along the ground, as will be referred to again hereinbelow. The unit 53 just described being secured to the supply pipe 42 serves as the means directly mounting the supply pipe on the carriage.

The wheels 50 may be of any suitable type, such as pneumatic, and each mounted in a yoke 70, having a top plate 72 (FIGS. 18, 19) which engages a plate 74 on the lower end of the corresponding frame member 46. The yoke and thus the wheel, is mounted for selective positioning about a vertical axis by means of a bolt 76 and is held in selected position by means of a transporting 78 extending through a hole in the plate 74 and in either of the holes 80, 82 in the plate 72. The holes 80, 82 are disposed 90° apart about the axis of the bolt 76 and when the pin 78 is positioned in the hole 80, the wheels are positioned as indicated in FIGS. 5 and 6 for the irrigating operation, and travel in direction generally transverse to the direction of the supply pipe, but when the pin is positioned in the other hole 82, the wheels are aligned longitudinally of the supply pipe for transforting the apparatus from one field to another.

On each side of the carriage is a vertical compression spring means 84 interconnected between the upper leg of one frame member 46 and the lower leg of the other frame member. This construction may be of any suitable compression arrangement, as desired such for example as shown in FIG. 12, in this case including a rod 86 connected with the lower end of the frame member and another rod 88 connected with the upper end of the other frame member, one rod, 88, has a tube 91 extending through the plate, and the other rod, 86, extending through the plate and telescoped in the tube. The tube and extension of rod 86 are surrounded by a compression spring 92, compressed between those plates. Upon upward movement of the wheels, in response to unevenness in the ground, the frame members tend to spread to a position indicated in FIG. 6, against the reaction of the compression spring means 84; the unevenness in the ground and spreading of the frame members provide a mutually compensating effect, and the result is that the position of the supply pipe 42 tends to remain in the absolute vertical height as theretofore, i.e., relative to a normal ground level without such unevenness, resulting in a tendency to uniform horizontal positioning of the pipe, it being understood, of course, that this condition is not achieved exactly, but vertical unevenness of the pipe is minimized. The pipe possesses a substantial degree of flexibility, bending to a considerable extent in such conditions, it being not necessary to provide flexible couplings between the sections of the pipe.

It will be noted the wheels 48 are relatively small, and they may be ordinary automobile tires, while the pipe 42 can be and is supported at relatively great height, for passing over crop plants.

Means is provided for supporting the supply pipe at a plurality of positions between adjacent carriages 44. This arrangement is shown best in FIGS. 3, 4, 8, 10, 11. Supporting elements 94, which may be rods, are interconnected between the outer ends of the frame members 46 and the pipe. One convenient means of connecting these rods to the pipe is indicated in FIG. 10 which may consist of a plate 96 welded to the underside of the pipe and having flanges 98 in which the elements 94 are secured. The other ends of the rods extend through the outer ends of the frame members as shown in FIG. 8, and provided with compression springs 100 compressed between the frame member itself and securement members 102 on the extended ends of the rods.

Additionally other supporting elements 104 which may be rods or cables, preferably cables, are secured to the outer ends of the frame members 46 by suitable means indicated by 106, which need not be provided with resilient means such as compression springs. Preferably these elements or cables 42 pass under the supply pipe and extend to the respective but opposite frame members of the next carriage, in both directions. The support elements 104 therefore support the pipe midway between the frame members while the other elements 94 are positioned for supporting the pipe preferably at positions one-fourth the spacing from the carriage. Upon movement of the carriages, or the pipe, relative to each other, the elements 104 may shift longitudinally, and preferably therefore are not fixed to the pipe but allowed to shift, but are however passed through tubes 105 welded to the pipe, to prevent rubbing of the cables together. The support members 94, 104, thus support the supply pipe at three points between each two adjacent carriages, and thus at points one-fourth the length of the segments of the supply pipe between the carriages, this distance as indicated above being in one example of construction on the order of 100 feet, and thus the pipe, for example being 6 inches in diameter, is well supported at 25 foot intervals. Since the outer or longer support elements 104 extend from one carriage to the next, it is unnecessary to provide cushioning or resilient members such as the compression springs 102 provided on the shorter supporting elements 94. Additionally, cables or rods 107 are provided on the sides interconnecting all the carriages, to provide a substantial degree of rigidity, resisting displacement horizontally about vertical axis. In this case there preferably are no resilient yielding means interposed between the cables and carriages, but may be rigid as indicated at 108 in FIG. 8.

FIGS. 13 and 14 together show in detail the spray unit and a self propelling unit associated therewith which are included in FIGS. 5 and 6 on a smaller scale. Leading from the supply pipe 42 is a water line 109 of suitable kind such as a flexible hose preferably having a control valve 110 and terminating in a nozzle construction 112 preferably including a pair of arms 114 having nozzles 116 directed horizontally and generally oppositely but tangential to a water wheel 118 (FIG. 15) on the propelling unit 120 (FIG. 14) described below.

The propelling unit 120 is directly associated with the gear reducer 57 (FIGS. 5, 6, 9 and 14) which has an input shaft 122. Connected with the input shaft 122 by suitable connections such as a universal joint 124 or equivalent, is another shaft 126 on which the wheel 118 is secured. The shaft 126 may be supported by suitable means such as a bearing 128 supported by a link 130 secured to the associated frame member 46. The wheel 118 includes a disc 136 forming the body of the wheel from which are struck vanes 138 extending generally axially. The water upon emerging from the nozzles 116 strikes the vanes, rotating the wheel and shaft which in turn acting through the gear reducer and output shaft 64 and further through the sprockets 66, 68 and chains 50, drive the wheels 48 and thus propel the carriage along the field in direction generally transverse to the length of the supply pipe 42. In the foregoing description the pipe follows a rotary motion but in another form of the invention the apparatus follows a uniformly straight direction transverse to the pipe, and the transverse movement referred to is intended to be generic to the movement in both cases.

FIG. 16 shows a slightly modified construction, utilizing a pair of flexible couplings 132 in the self propelling unit instead of the universal joint 124 of FIG. 14.

FIG. 17 shows a detail modification; a tube or pipe 134 receives the shaft 126 and a flexible hose 136 leads from the supply pipe 42 to the tube, and the outer end of the latter is provided with a spray head 112 of FIG. 13.

An important feature of the invention is that the water is distributed rearwardly of the apparatus, leaving dry the ground where the wheels are positioned and thus not interfering with the traction provided the wheels on the dry ground.

The spray nozzles 116 are operative for distributing the water fully throughout the intended distance, e.g., 50 feet plus a distance for assurance of full coverage.

The rate of movement of the apparatus is very slow, one example being one complete rotation in 11 days, and therefore the speed reduction between the water wheel 118 and the propelling wheels is enormous. Consequently the water wheel provides great torque, sufficient for easily driving the apparatus.

FIG. 20 shows a carriage structure which includes frame members 46 which are rigidly secured together. The frame members may be interconnected by rigid elements 138 and bolted as indicated at 140. There are many instances where land to be irrigated is substantially flat and in such case the retracting type of carriage described above is not necessary, and the rigid type is less expensive.

FIG. 21 indicates the use of the apparatus in a rectangular field but in a pattern of movement which is directly and uniformly transverse to the direction of the apparatus. A water main is indicated at 144 from which rise a plurality of standpipes 146 along one edge of the field. The apparatus may be connected to each standpipe by a flexible connection 148 enabling the apparatus to move by self-propulsion a distance equivalent to the spacing between the standpipes, i.e., from midway between one pair of standpipes to midway between the next two.

It will be understood that the gear reducers 57 in the first embodiment are selected according to speed reduction to provide the progressively greater speed outwardly from the axis, while in the present instance all of them are of the same reduction ratio.

FIG. 22 shows a carriage 146 including frame members 148 generally similar in construction to the frame members 46 but each made of sections detachably secured together by pieces 150, defining openings 152 receiving the supply pipe 42 therein. The mounting unit 53 may be incorporated as before, while the axis 62 is disposed in the upper edges of the frame members. In addition to the compression springs 84, horizontal tension springs 152 interconnect respective arms of the frame members and bias the carriage to retracted position.

FIG. 23 shows a form of gear reducer 57 which includes a housing 153 having fixed member 154 in which is rotatably mounted a member 156 having an internal ring gear 158 and an output shaft 160. Another fixed housing member 162 has a fixed internal ring gear 164 having a different number of of teeth from the ring gear 158. Rotatably mounted in the member 162 is an input shaft 166 having a squared inner end portion 168 (see also FIG. 24) loosely receiving a sun gear 170, and meshing with the sun gear and both ring gears is a floating planet gear 172.

The housing member 162 is provided with hand grip elements 174 facilitating separating the housing members. The operator can then quickly replace the sun gear and planet gear with ones of different sizes for changing the ratio of gear reduction. The member 162 is biased to closed position by a compression spring 176 working against a fixed element 180, the input shaft 166 being telescoping for example to accommodate movement of the member 162.

The input shaft 166 has the water wheel 118 mounted thereon, while the output shaft 160 preferably operates through a worm gear component 182 which drives the chain 52 for driving the carriage.

I claim:

1. Irrigation apparatus comprising, a relatively long supply pipe adapted for connection at one end to a water main, and adapted for movement in direction generally transverse to its length, a plurality of carriages supporting the supply pipe at points spaced along the supply pipe and supporting it in spaced relation above the ground, each carriage including a pair of frames, and a wheel on each frame, lying generally in a plane transverse to the length of the supply pipe with the wheels spaced a substantial distance transversely of the supply pipe and positioned on opposite sides thereof, yielding means incorporated in the carriage enabling rising of each wheel independently of the other and relative to the body of the carriage in response to encountering a rise in the ground, whereby to limit movements of the supply pipe to an extent less than in the case of a rigid carriage and wheels rigidly mounted therein.

2. Irrigation apparatus according to claim 1 wherein the yielding means is operative for enabling yielding movement of the frames in response to vertical movements of the wheels mounted in the respective frames, in response to encountering rises in the ground, and the carriage having means supporting the supply pipe at a point closely adjacent the position of connection between the frames.

3. Irrigation apparatus according to claim 2, wherein the frames are pivotally interconnected in the form of an "X" forming a pair of downwardly diverging legs on which the wheels are mounted and upwardly diverging upper extensions of the frames, compression springs mounted between the upper extensions and legs on the opposite sides of the carriage, the frames yielding in response to either of the wheels encountering rises in the ground in response to which the respective wheels rise and cause the frames to move relatively toward a flattened position against the action of the compression springs, whereby to minimize vertical movements of the pivot axis between the frames in response to such vertical movements of the wheels, and the carriage supporting the supply pipe at a point closely adjacent to and vertically fixedly secured in association with the axis of said pivot axis.

4. Irrigation apparatus according to claim 3 wherein the upper extensions of the frames according to their construction as specified, extend beyond the supply pipe both upwardly and laterally, and the apparatus including supporting cables secured to the upper ends of the respective extensions of the frames and toward the next carriages along and under the supply pipe.

5. Irrigation apparatus according to claim 4 wherein said supporting cables are non-yieldingly secured to the upper ends of the carriage frames, and also wherein such supporting cables are mounted for relative sliding movement longitudinally of the supply pipe and in direction from one carriage to the next.

6. An irrigation apparatus according to claim 3 and including supporting cables from the upper extended ends of the carriage frames to the supply pipe at points on the latter less than half the distance to the next adjacent carriage.

7. Irrigation apparatus according to claim 6 wherein the support cables are rigidly secured to the supply pipe and yieldingly connected to the upper ends of the carriage frames, whereby to effectively change the length of those support cables in response to the carriage frames pivoting relative to each other in consequent vertical and lateral movements of the upper extended ends thereof.

8. Irrigating apparatus according to claim 3 wherein the upper extensions of the frames extend beyond the supply pipe both upwardly and laterally, and the apparatus including cables connected with said extensions and inclined inwardly toward and secured to the supply pipe and thereby resisting deflection of the supply pipe in transverse directions.

9. Irrigation apparatus according to claim 8 wherein the supporting cables include certain cables secured to said upper extensions and secured directly to the supply pipe.

10. Irrigation apparatus as set out in claim 8 in which certain of the supporting cables are secured to said upper extensions in adjacent carriages and also support the supply pipe at positions substantially midway between the adjacent carriages, and whereby upon transverse movement of the ends of said upper extensions, and consequent lowering or raising of the supply pipe supported thereby, the supply pipe in its vertical movements is maintained substantially midway between the ends of said upper extensions and thereby maintained substantially against transverse horizontal deflection.

11. Irrigation apparatus according to claim 1 wherein each carriage includes a pair of frame members pivotally interconnected on an axis extending generally along the pipe and having upwardly and outwardly extending terminal arms, and self propelling means which includes a gear reducer, an input shaft operatively connected thereto and extending therefrom rearwardly relative to the direction of movement of the apparatus, and having a water wheel on the outer end thereof, water line leading from the supply pipe to said water wheel and having nozzles directed against the water wheel in position for rotating it, means interconnecting the gear reducer and the wheels of the carriage propelling the carriage, the propelling means including a shaft extending rearwardly from the supply pipe, and links suspending the outer end of the shaft from the upper outer end of the respective frame member of the carriage.

12. Irrigation apparatus according to claim 11 wherein the propelling means incorporates a sprinkler unit including a flexible conduit leading from the supply pipe outwardly to the water wheel.

* * * * *